United States Patent [19]

Kaul

[11] Patent Number: 4,586,177
[45] Date of Patent: Apr. 29, 1986

[54] INTEGRATED NARROWBAND AND WIDEBAND TDMA NETWORKS

[75] Inventor: Pradman Kaul, Gaithersburg, Md.

[73] Assignee: M/A-COM DCC, Inc., Germantown, Md.

[21] Appl. No.: 557,724

[22] Filed: Nov. 15, 1983

[51] Int. Cl.[4] ............................................. H04J 3/06
[52] U.S. Cl. ................................................. 370/104
[58] Field of Search .................... 370/104, 38, 58, 36, 370/37; 455/12, 103, 133, 134, 135

[56] References Cited

U.S. PATENT DOCUMENTS

| | | | |
|---|---|---|---|
| 3,277,374 | 10/1966 | Kobayashi | 455/133 |
| 3,879,580 | 4/1975 | Schlosser et al. | 455/12 |
| 4,051,475 | 9/1977 | Campbell | 370/37 |
| 4,201,892 | 5/1980 | Schmidt | 370/104 |
| 4,257,119 | 3/1981 | Pitroda | 370/58 |
| 4,339,824 | 7/1982 | Tanimoto | 370/104 |

OTHER PUBLICATIONS

"FM SCPC System for Various Domestic Satellite Communications Earth Station", Shimayama et al., I.C.C. '79, Boston, MA, USA, Jun. 10-14, 1979.

Primary Examiner—Douglas W. Olms
Assistant Examiner—Kenneth I. Rokoff
Attorney, Agent, or Firm—Pollock, Vande Sande & Priddy

[57] ABSTRACT

Time Division Multiple Access (TDMA) is being utilized widely in domestic and international communication networks. The types of TDMA networks in operation fall into two categories: Wideband and Narrowband. In the past few years, a number of Wideband and Narrowband TDMA networks have gone into operation. However, these networks have typically operated as independent nets. As the existing Wideband TDMA networks expand into cities with a smaller amount of originating traffic, a major economic problem occurs. It becomes difficult to justify the cost of a Wideband TDMA station for the smaller amount of traffic.

This invention presents an approach that solves the above problem by providing an integrated network with Wideband TDMA for the large cities and Narrowband TDMA for the smaller cities.

9 Claims, 5 Drawing Figures

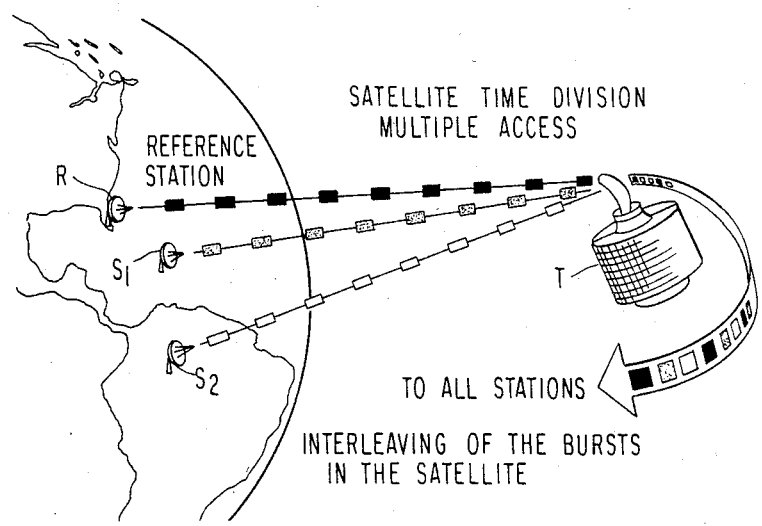
FIG. 1  TDMA CONCEPT
FIG. 5
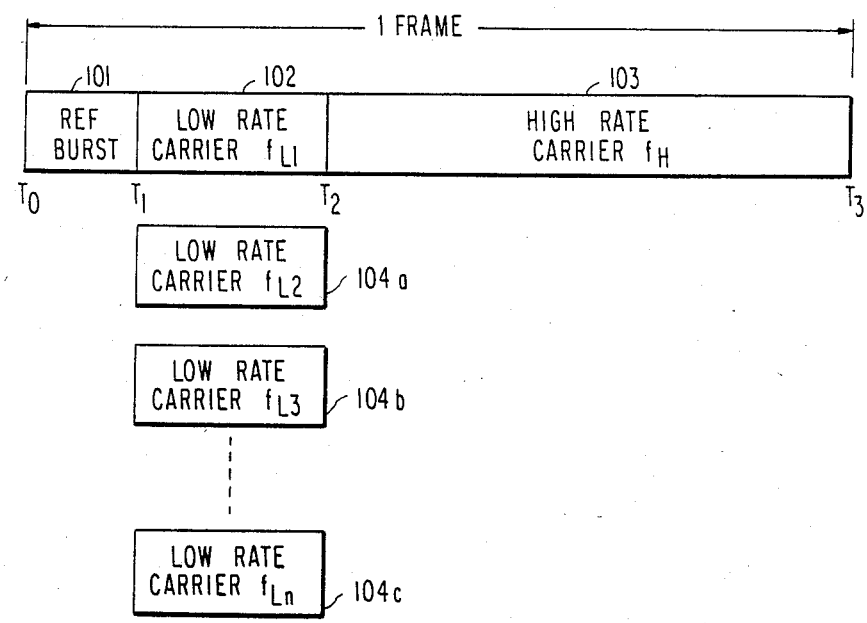

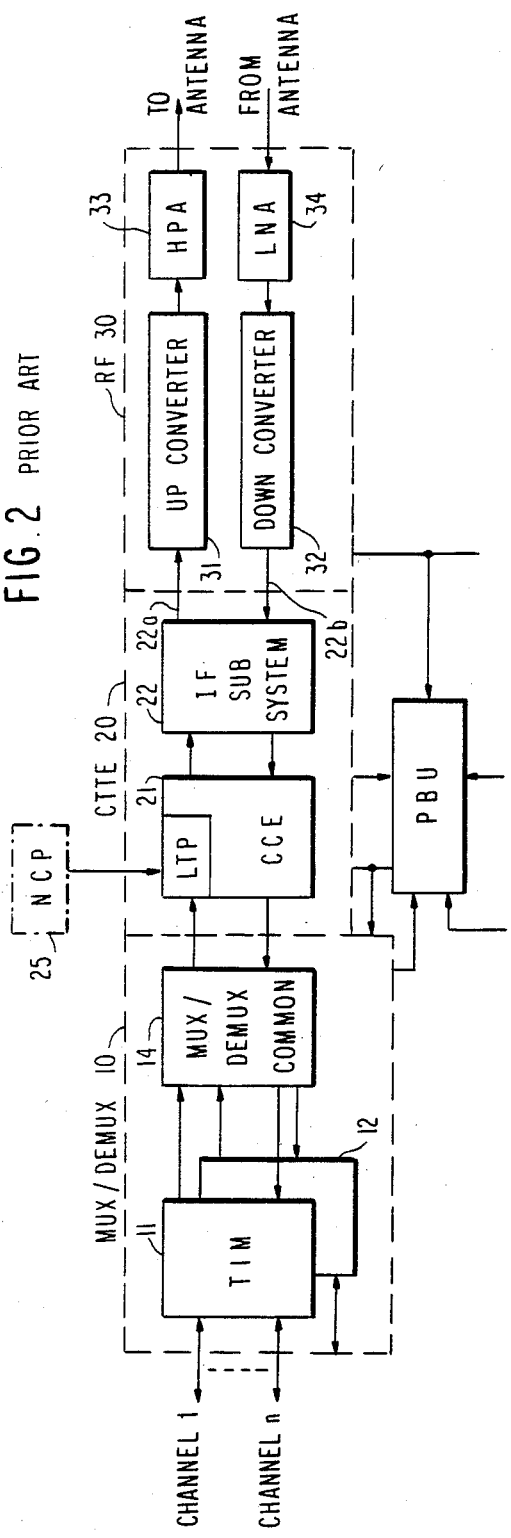
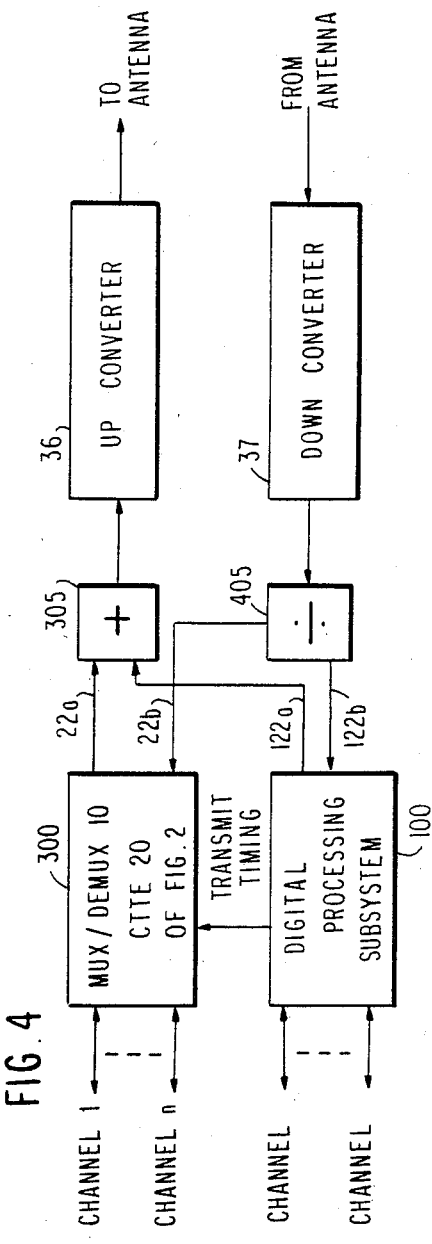
FIG. 2 PRIOR ART
FIG. 4

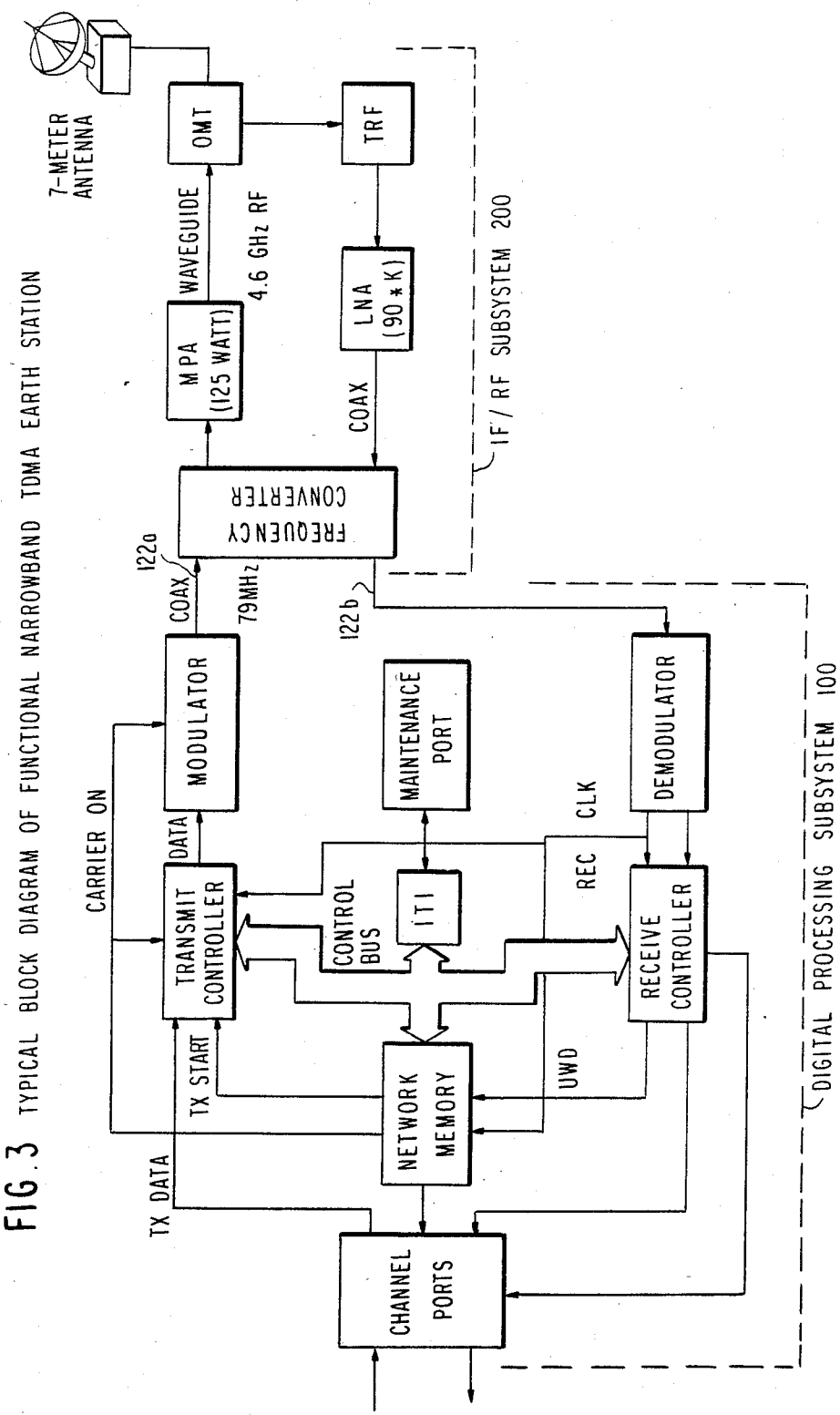
FIG. 3 TYPICAL BLOCK DIAGRAM OF FUNCTIONAL NARROWBAND TDMA EARTH STATION

INTEGRATED NARROWBAND AND WIDEBAND TDMA NETWORKS

DESCRIPTION

1. Field of the Invention

The present invention relates to TDMA systems and particularly an integrated TDMA network including wideband and narrowband stations, providing for full connectivity.

2. Background Art

Time Division Multiple Access (TDMA) is an effective method of significantly increasing satellite channel capacity and improving satellite system flexibility, see O. G. Gabbard and Pradman Kaul, "Time Division Multiple Access", *Proceedings of Eascon-74*, pp. 179–184. As a result, a majority of the new satellite networks that have gone into operation over the last few years use TDMA as the multiple access technique.

In a TDMA network, multiple satellite earth stations share a common transponder or bandwidth by transmitting bursts of carrier signals which arrive at and pass through the transponder in a sequential, non-overlapping mode. Actually, the transponder effects a frequency conversion so that the uplink and downlink carriers are different. In a wideband TDMA network, multiple transponder operation is also possible from single TDMA terminals using time swiched up and down converters. In a narrowband TDMA network, the same effect is obtained by frequency hopping among different carriers in the same transponder. In both narrowband and wideband TDMA, one earth station acts as a reference and transmits periodic bursts as reference timing. The other stations in the network synchronize their transmit timing to this reference burst through the satellite so that their respective burst transmissions are within their assigned time slots. This process is known as burst synchronization and was successfully demonstrated in experimental TDMA systems in the 1960's, see O. G. Gabbard, "Design of a Satellite Time Division Multiple Access Burst Synchronizer", *IEEE Transactions on Communications Technology*, Vol. COM-16, August 1968 and W. G. Schmidt, 0. G. Gabbard, E. R. Cacciamani, W. G. Maillet and W. W. Wu, "Mat-1: INTELSAT's Experimental 700 Channel TDMA/DA System.", *Proceedings of the* 1969 *INTELSAT Digital Satellite Communications Conference*, London, pp. 428–440.

There are two kinds of TDMA networks in operation, vis. wideband and narrowband. These are described in the two following sections in more detail.

Wideband TDMA

A prime characteristic of a wideband TDMA network is that there is only one carrier in the transponder at any given instant. Thus, the transponder can be operated near saturation, making maximum use of available satellite power. The operational systems of this type operate a bit rates between 25–120 Mbps depending on the transponder characteristics. Some of the major networks in or near operation are:

| | | |
|---|---|---|
| 1. Telesat Canada | 61 | Mbps |
| 2. American Satellite Corp. | 64 | Mbps |
| 3. RCA Americom | 60 | Mbps |
| 4. Federal Express | 64 | Mbps |
| 5. SBS | 43–48 | Mbps |
| 6. CITIBANK | 60 | Mbps |
| 7. INTELSAT | 120 | Mbps |
| 8. EUTELSAT | 120 | Mbps |
| 9. ARGO | 60 | Mbps |
| 10. TELECOM-1 (France) | 25 | Mbps |

The first two systems are described in Robert Kwan, "The Telesat TDMA System," *Proceedings of the International Conference on Communications*, San Francisco, June 1975 and S. Mittal, E. R. Cacciamani, Jr., J. Hangen, "Use of TDMA in a Domestic Satellite Communications System," *Proceedings of EASCON-79*, respectively.

This list is not exhaustive but indicates the tremendous growth in the use of wideband TDMA over the last few years.

Digital Speech Interpolation (DSI) is generally used in the wideband TDMA network to increase the voice channel capacity. Some typical capacities of TDMA/DSI networks are:

INTERSAT/EUTELSAT Network—Approx. 4000 VG Channels/Transponder (72 MHz)

American Satellite—2000 VF Channel/Transponders (36 MHz).

With some new DSI units that offer 4 to 1 compression, it will be possible to put 8000 VF channels in a 72 MHz transponder of a domestic satellite. Systems of this type will be in operation in 1984.

Wideband TDMA networks typically need larger earth stations because of the high bit rates. At C-band, the antenna sizes are 10–30 meters; high power amplifiers (or HPAs) used are 3 kW klystrons, and low noise amplifiers (or LNAs) are paramps with noise temperatures of 50° K.

A typical C-band domestic wideband TDMA earth station can cost up to $1 million. Consequently, each station must have a heavy amount of traffic originating from that site to justify it economically. However, as networks expand from major cities to the second tier cities, the amount of traffic originating from them may not justify the use of wideband TDMA and consequently other methods such as backhauling the traffic terrestrially to a major city have been used.

Narrowband TDMA

For low to medium capacity networks, the optimum multiple access technique is to use narrowband TDMA. In such a network, multiple carriers share a transponder in a FDMA mode. However, multiple earth stations access a particular carrier frequency in the TDMA mode.

TDMA was initially intended for high capacity trunking applications with the high bit rate capacity per transponder being the prime reason for its use. However, in the late 1970's, narrowband TDMA was used in networks for reasons other than maximum throughput. The major reasons for its use were flexibility, connectivity, and ease of interfacing with digital interconnections, see S. Salamoff et al, "Medium Rate TDMA for Thin Route Voice and Data Networks", *Proceedings of the 5th Digital Satellite Communications Conference*, Geneva, March 1981. The major features of these networks are:

Transmission speeds from 1 Mbps to 15 Mbps

Rapid reconfiguration of traffic connectivity by using dynamic assignment.

Channel port interfaces for voice, data from 50 bps to 1.544 Mbps, and video teleconferencing.

Some of the organizations using Narrowband TDMA networks presently are:
1. Dow Jones
2. Telesat Canada
3. Niagara Mohawk Power Corporation
4. American Satellite
5. German PTT
6. British Telecom.

These terminals typically operate in C-band earth stations with 5-7 meter antennas, 125 W TWT HPAs, and 90° K. GaAs FET low noise amplifiers. These earth stations are therefore relatively inexpensive in the order of $250 K.

Integrated Networks

As the existing wideband TDMA network expands into cities with a smaller amount of originating traffic, a major economic problem occurs because the smaller city cannot justify a large earth station. It would, therefore, be very desirable if a network could be designed to have narrowband and wideband TDMA in the same system with full connectivity. This would allow the network designer to select the appropriate system for each city based on the amount of traffic originating from it.

One method that has been proposed is the use of dual rate TDMA, see J. Ramasastry, Pradman Kaul et al, "Advanced Westar's SSTDMA System", *Proceedings of the* 1978 *Digital Satellite Conference,* Montreal, and Schmidt U.S. Pat. no. 4,201,892. The major disadvantage of this approach is that the space segment utilization is very inefficient because, during the low speed part of the frame, the bit rate reduction could be as high as 20 to 1 in the case of a 120 Mbps dual rate system. Note that Schlosser et al U.S. Pat. Nos. 3,879,580 and 3,879,581, which disclose a processing repeater system, do not address the problem solved by this invention. Although the Schlosser et al system operates at a dual rate, there is one rate *all* stations use for transmission and another, different rate used for the downlink for *all* stations.

SUMMARY OF THE INVENTION

The present invention also uses a dual rate system but significantly increases the efficiency during the low rate period. The system includes high and low bit rate stations. The high bit rate stations can operate in a TDMA mode at 60/120 Mbps. A portion of the TDMA frame is saved for transmissions from the low bit rate stations. During this period, multiple 6 Mbps carriers are transmitted in TDMA/FDMA mode, usually from the small stations. In a typical 36 MHz transponder case up to five 6 Mbps carriers could be transmitted at the same instant, so the information carrying capability of the transponder is not reduced significantly during this period. Each of the high bit rate stations contain two sets of baseband equipment, both 60 Mbps TDMA and 6 Mbps TDMA. The RF equipment is unchanged. All the low bit rate stations would be equipped only with the narrowband TDMA equipment. The major advantages of this technique are:

One hop connectivity among all earth stations
Reduced network price because majority of stations operate at the lower rate
Maximum utilization of space segment by using dual rate TDMA and multiple carriers (TDMA) with the narrowband TDMA.
Optimum use of appropriate RF equipment and the Central Network Control Processor.

Accordingly, the invention provides a communication system including a quasi-stationary earth orbiting transponder and at least two groups of earth stations communicating through said transponder, comprising:

a first group of stations communicating with each other in a TDMA format through said transponder at a first bit rate, and at a common carrier frequency, one of said first group stations including means for transmitting at least a single reference burst per frame at a second bit rate, lower than said first bit rate.

a second group of stations communicating with each other and with first group stations in a FDMA/TDMA format through said transponder at said second bit rate, stations in said second group transmitting at different carrier frequencies when transmitting at common time, whereby full connectivity throughout all said stations is maintained and efficiency loss is minimized through the multiple simultaneous transmissions from second group stations at said second bit rate.

BRIEF DESCRIPTION OF THE DRAWINGS

The present invention will be further described in the following portions of this specification so as to enable those skilled in the art to make and use the same in connection with the attached drawings in which like reference numbers identify identical apparatus and in which:

FIG. 1 illustrates the basic TDMA format;

FIG. 2 is a functional block diagram of a typical wideband TDMA earth station,

FIG. 3 is a block diagram of a functional narrowband TDMA earth station;

FIG. 4 provides a block diagram of equipment at a large or high bit rate earth station in accordance with the present invention;

FIG. 5 illustrates a typical frame format.

DETAILED DESCRIPTION OF THE INVENTION

FIG. 1 is a conceptual drawing illustrating typical (prior art) TDMA operation, usually of the wideband variety. As shown in FIG. 1, a transponder T is located in quasi-stationary earth orbit. A plurality of stations, including a reference station R, and typical traffic stations $S_1$ and $S_2$ transmit (at a common carrier frequency) in a burst format. The bursts are properly timed so that they interleave at the transponder T, and therefore the transponder transmits to all stations a sequence of the received bursts. Because the timing is appropriate, and the burst interleave at the transponder T, each burst is retransmitted intact, that is, without interference by any other burst. It should be apparent then, that all bursts can be received at any one of the stations R, $S_1$, $S_2$, etc., thereby providing complete connectivity between all stations in the network.

FIG. 1 can also be used to explain the operation of narrowband TDMA. In narrowband TDMA, some of the bursts may be transmitted so as to arrive at the transponder T, simultaneouly. However, bursts which are so transmitted, are transmitted on different carrier frequencies, and do not occupy the entire bandwidth of the transponder. As a result, even simultaneously transmitted bursts (that is the bursts transmitted to be received simultaneously at the transponder T) maintain their individual integrity, and are retransmitted without interference from other bursts.

FIG. 2 illustrates a block diagram of a typical wideband TDMA station. As shown, the station equipment can include MUX/DEMUX equipment 10, CTTE 20 as well as a RF 30, the latter module is coupled to an antenna. More particularly, the MUX/DEMUX 10 includes one or more TIMs 11, each serving a plurality of channels, on the terrestrial side. The TIMs 11, on the other hand, interface with the MUX/DEMUX common equipment 14. The CTTE 20 includes a common control element 21 interfacing with the IF subsystem 22. The IF subsystem 22 has an IF output terminal 22a, and an IF input terminal 22b. The former terminal connects to an up converter 31 in the RF section 30 whereas the latter terminal is responsive to an output of a down converter 32. The up converter and down converter in turn are connected to an antenna through a high powered amplifier (HPA) 33 and a low noise amplifier (LNA) 34, respectively. At a network control station (which may or may not be the station transmitting the reference burst or bursts), a network control processor (NCP 25 is located. Inasmuch as the block diagram of FIG. 2 is known to those skilled in the art, a further detailed description of the components and operation will not be provided.

FIG. 3 is a typical block diagram of a narrowband TDMA earth station. As shown in FIG. 3, the earth station includes a digital processing subsystem 100 and an IF/RF subsystem 200. Although not specifically shown in FIG. 3, those skilled in the art are aware that narrowband systems can frequency hop within a transponder by controlling the carrier frequency in the modulator and demodulator. The modulator provides IF out to the frequency converter on lead 122a, and the demodulator receives IF from the frequency converter on a lead 122b.

In accordance with the present invention, the stations typically transmitting at the lower bit rate (sometimes referred to as the "second" bit rate) are configured along the lines shown in FIG. 3 for a typical narrowband TDMA earth station. In accordance with the invention, other stations (the ones that may operate either at the second rate or at the first or higher bit rate) are modified from the block diagram shown in FIG. 2. More particularly, high capacity or wideband stations have, co-located in the common TDMA equipment 300 including the MUX/DEMUX 10, the CTTE 20. In addition, the digital processing subsystem 100 at the high bit rate stations may be identical to that equipment located at the low bit rate stations. The high bit rate stations also include a single RF section including up converter 36 and down converter 37. The wideband common equipment 300 and the narrowband common equipment 100 each have IF inputs and outputs. FIG. 4 shows that the wideband IF input/output on conductors 22a and 22b are coupled respectively to an OR gate 305 and a divider 405. The IF input/output from the narrowband equipment 100 on leads 122a and 122b is also coupled to the OR gate 305 and divider 405. The output of the OR gate 305 is coupled to an up converter 36, whereas the input to the divider 405 comes from a down converter 37. Thus, OR gate 305 has two inputs, one on conductor 22a, from the IF output of the wideband equipment 300, and the other is provided by the IF output on lead 122a of the narrowband equipment 100. Likewise, the divider 405 has two outputs, one on conductor 22b (the wideband IF input) and the other on conductor 122b to the narrowband equipment 100. Switching, at a station such as shown in FIG. 4, for communication selectively to high or low rate stations is handled by an external arrangement.

FIG. 5 illustrates the frame format for the integrated wideband/narrowband network. As shown in FIG. 5, the frame can be divided into three portions, a portion 101 containing the reference burst or bursts (extending between a time $T_0$ to a time $T_1$), a second portion 102 (extending between times $T_1$ to $T_2$) for the second bit rate or low bit rate transmission, and a final portion 103 (extending from time $T_2$ to $T_3$, the end of the frame) for the first bit rate or higher bit rate transmissions. FIG. 5 is different from typical TDMA frame formats in two respects. In the first place, extending between the times $T_1$ and $T_2$, there is actually more than a single burst, e.g. burst 102, 104a, 104b and 104c. Each of these bursts are transmitted, however, at a different carrier, e.g. $F_{L1}$, $F_{L2}$, $F_{L3}$, $F_{LN}$, each of these carriers is within the pass band of the transponder T, and are offset one from another so that considering the respective bandwidth of the different bursts, they do not interfere with each other and therefore retain their identity and are retransmitted on corresponding (but different) carrier frequencies. Thus, whereas in a typical wideband application, there is only a single burst at any instant of time, in the period between $T_1$ and $T_2$, the network is operating in a frequency hopping FDMA mode. Thereafter, for the remainder of the frame, however, the format takes on the appearance of a typical wideband network.

The burst portion 101 is preferably transmitted at the lower or second bit rate. Accordingly, each of the narrowband stations can obviously derive their timing from the reference burst portion 101. Furthermore, the wideband stations, since they have co-located equipment for responding to the lower bit rate, can also derive their reference or transmit timing therefrom and the transmit clock in the wideband 300 equipment at the wideband stations is locked to the clock derived from the narrowband equipment 100 at the wideband stations. It should be understood that FIG. 5 does not specify the number of reference bursts in the reference burst portion 101, and multiple reference bursts may be employed, if desired, although preferably each is at the common second or lower bit rate.

Typically, then, as shown in FIG. 5, there are multiple simultaneously transmitted (referenced at the transponder T) bursts transmitted in the narrowband portion 102 of the frame. As an example, using the parameters already described with the wideband stations transmitting at the higher bit rate of 60 megabits per second and the narrowband stations transmitting at 6 megabits per second, we can insert five different carriers at the second or lower rate. This use of five simultaneous carriers can be achieved with approximately 3 dB output back off at the transponder TWTA to result in acceptable carrier/intermodulation performance. The loss of capability during the narrowband portion 102 then is only 2 to 1 (6 megabits×5=30 megabits, vs. 60 megabits) as opposed to 10 to 1 if only dual rate TDMA were used (6 megabits vs. 60 megabits).

Operation at the narrowband station (FIG. 3) is typical of narrowband network except that part of the frame (typically frame portion 103) is unavailable to these stations. The wideband stations (of FIG. 4) can transmit at any allocated time, except that bursts in the frame portion 102 are restricted in rate. However, all stations are now interconnected through a single transponder. Typically, the wideband stations have a higher G/T, and thus transmissions to these stations (at either bit rate) do not require error encoding. On the other hand, transmissions to the narrowband stations may use error encoding.

In addition, since we have now provided for complete interconnectivity, we can use a single NCP processor 25 containing network plans for the entire network which are down line loaded into all stations. Likewise, status and alarm signals can be gathered from all sites and displayed at the common NCP processor 25. The use of common NCP for both wideband and narrowband terminals is another major advantage of the invention.

I claim:

1. A communication system including a quasi-stationary earth orbiting transponder and at least two groups of earth stations communicating through said transponder comprising;

a first group of stations communicating with each other in a TDMA format through said transponder at a first bit rate, and at a common carrier frequency, one of said first group stations including means for transmitting at least a single reference burst per frame at a second bit rate, lower than said first bit rate, a second group of stations communicating with each other and with first group stations in a FDMA/TDMA format through said transponder at said second bit rate, and means for allocating frame capacity by uniquely assigning burst times to stations transmitting at said first bit rate and providing multiple simultaneous burst assignments to stations transmitting at said second bit rate, whereby full connectivity throughout all said stations is maintained and efficiency loss is minimized through the multiple simultaneous transmissions from second group stations at said second bit rate.

2. The system of claim 1 in which said multiple is smaller than the ratio of said first and second bit rates.

3. The system of claim 1 in which some of said stations include means for error encoding said transmissions and means for enabling said error encoding means when transmitting to said stations in said second group.

4. The system of claim 1 in which said first bit rate is 60 Mbps and said second bit rate is 6 Mbps.

5. The system of claim 2 in which said first bit rate is 60 Mbps, said second bit rate is 6 Mbps and said multiple is about 5.

6. A method of employing a single quasi-stationary orbiting transponder to provide for efficient communications among stations operating at dissimilar bit rates, some of said stations transmitting at a first bit rate and other of said stations transmitting at a second, lower, bit rate, comprising the steps of;

(a) establishing a periodic frame at said transponder by transmitting a frame reference burst at said second bit rate, at least once per frame, (b) providing each of stations with apparatus to detect said frame reference burst, (c) allocating unique burst times to stations for transmission at said first bit rate, (d) allocating to multiple stations common burst times for transmissions at said second bit rate, (e) transmitting from each of said stations, transmitting at said first rate, at a common carrier frequency and transmitting from each of said stations, simultaneously transmitting at said second rate, at different carrier frequencies.

7. The method of claim 6 in which said multiple is less than the ratio of said first and second bit rates.

8. The method of claim 6 in which said step (d) includes error encoding transmissions for transmissions to stations transmitting at said second rate.

9. The method of claim 6 which includes providing apparatus to effect said step (c) at a single location.

* * * * *